United States Patent
Segawa (10) Patent No.: US 10,019,965 B2
(45) Date of Patent: Jul. 10, 2018

(54) VEHICLE DISPLAY SYSTEM HAVING A PLURALITY OF COLOR TEMPERATURE SETTINGS

(71) Applicant: JVC KENWOOD CORPORATION, Yokohama-shi, Kanagawa (JP)

(72) Inventor: Masaru Segawa, Yokohama (JP)

(73) Assignee: JVC KENWOOD CORPORATION, Yokohama-Shi, Kanagawa (JP)

(*) Notice: Subject to any disclaimer, the term of this patent is extended or adjusted under 35 U.S.C. 154(b) by 0 days.

(21) Appl. No.: 15/593,360

(22) Filed: May 12, 2017

(65) Prior Publication Data

US 2017/0249923 A1 Aug. 31, 2017

Related U.S. Application Data

(63) Continuation of application No. PCT/JP2015/084263, filed on Dec. 7, 2015.

(30) Foreign Application Priority Data

Dec. 25, 2014 (JP) .................. 2014-262394
Dec. 25, 2014 (JP) .................. 2014-262395

(51) Int. Cl.
*G09G 5/02* (2006.01)
*H04N 5/232* (2006.01)
(Continued)

(52) U.S. Cl.
CPC ............ *G09G 5/02* (2013.01); *B60K 35/00* (2013.01); *B60R 1/00* (2013.01); *G02B 27/01* (2013.01);
(Continued)

(58) Field of Classification Search
None
See application file for complete search history.

(56) References Cited

U.S. PATENT DOCUMENTS

2012/0236042 A1* 9/2012 Parmar ............... G09G 3/3466
345/690
2014/0063197 A1* 3/2014 Yamamoto ............ G08G 1/166
348/46

(Continued)

FOREIGN PATENT DOCUMENTS

| EP | 3203463 | * | 9/2017 | ............... G09G 5/00 |
| JP | 2014144674 | * | 3/2013 | |
| JP | 2013-121804 A | | 6/2013 | |

OTHER PUBLICATIONS

PCT/ISA/237 issued in corresponding International Application No. PCT/JP2015/084263.

*Primary Examiner* — Mark K Zimmerman
*Assistant Examiner* — Phuc N Doan
(74) *Attorney, Agent, or Firm* — Nath, Goldberg & Meyer; Jerald L. Meyer; Stanley N. Protigal (57) ABSTRACT

A display system includes a plurality of display screens and a display controller. The plurality of display screens are disposed in front of the driver of the vehicle in a vertical direction in a row such that the distance from the viewpoint position of the driver differs, and present images showing predetermined information to the driver. The display controller is configured to display the images with a lower color temperature on the plurality of display screens, as the distance from the viewpoint position is longer.

6 Claims, 6 Drawing Sheets

(51) Int. Cl.
- *G06F 3/14* (2006.01)
- *B60K 35/00* (2006.01)
- *G09G 5/00* (2006.01)
- *B60R 1/00* (2006.01)
- *G02B 27/01* (2006.01)
- *H04N 7/18* (2006.01)

(52) U.S. Cl.
CPC ............ *G06F 3/1431* (2013.01); *G09G 5/00* (2013.01); *H04N 5/23293* (2013.01); *H04N 7/183* (2013.01); *B60K 2350/2008* (2013.01); *B60K 2350/2052* (2013.01); *B60K 2350/352* (2013.01); *B60K 2350/92* (2013.01); *B60R 2300/105* (2013.01); *B60R 2300/205* (2013.01); *B60R 2300/8046* (2013.01); *G02B 27/0101* (2013.01); *G02B 2027/0112* (2013.01); *G02B 2027/0118* (2013.01); *G02B 2027/0138* (2013.01); *G09G 2300/026* (2013.01); *G09G 2320/0666* (2013.01); *G09G 2380/10* (2013.01); *H04N 7/181* (2013.01)

(56) References Cited

U.S. PATENT DOCUMENTS

| | | | |
|---|---|---|---|
| 2014/0285431 A1* | 9/2014 | Yeom | G09G 5/00 345/156 |
| 2014/0285477 A1* | 9/2014 | Cho | G09G 3/2003 345/207 |
| 2015/0199935 A1* | 7/2015 | McRae | G09G 3/3607 345/694 |
| 2016/0001693 A1* | 1/2016 | Tamura | G01C 21/3632 340/441 |

* cited by examiner

FIG. 8

VEHICLE DISPLAY SYSTEM HAVING A PLURALITY OF COLOR TEMPERATURE SETTINGS

CROSS REFERENCE TO RELATED APPLICATION

This application is a Continuation of PCT Application No. PCT/JP2015/084263, filed on Dec. 7, 2015, and claims the priority of Japanese Patent Application No. 2014-262394, filed on Dec. 25, 2014, and No. 2014-262395, filed on Dec. 25, 2014, the entire contents of all of which are incorporated herein by reference.

BACKGROUND

The present disclosure relates to a display system for presenting information to a user.

In an instrument panel used in a vehicle such as an automobile, a display by a mechanistic indicator is replaced with a display device using a liquid crystal panel and the like, and there is an instrument panel capable of arbitrarily changing display content and a display mode.

A display device for presenting a driver with the image obtained by capturing the rear side from the vehicle, and a head-up display and the like capable of allowing a driver to see various types of information with less sight movement are employed for an automobile.

Japanese Unexamined Patent Application Publication No. 2013-121804 discloses an in-vehicle display system including a plurality of display screens and changing a display part which is a display destination of information according to priorities of the information.

SUMMARY

An in-vehicle display system using a plurality of display screens can present many types of information to a user who is the driver. However, when the number of screens for displaying information is large, there is a case in which the driver has a feeling of oppression, or feels fatigue by the visual recognition of information.

An aspect of the embodiment provides a display system including: a plurality of display screens disposed in front of a driver of a vehicle in a vertical direction, in a row such that the distance from the viewpoint position of the driver differs, and is configured to present images showing predetermined information to the driver; and a display controller configured to display the images with a lower color temperature on the plurality of display screens, as the distance from the viewpoint position is longer.

DETAILED DESCRIPTION

Hereinafter, a display system 1 according to the embodiment will be described. An example in which the display system 1 is applied to an automobile will be described as the present embodiment; however, the display system 1 can be applied to various movable bodies such as a railroad, an aircraft, a ship, and a two-wheel vehicle, in addition to the automobile.

Figure 1:
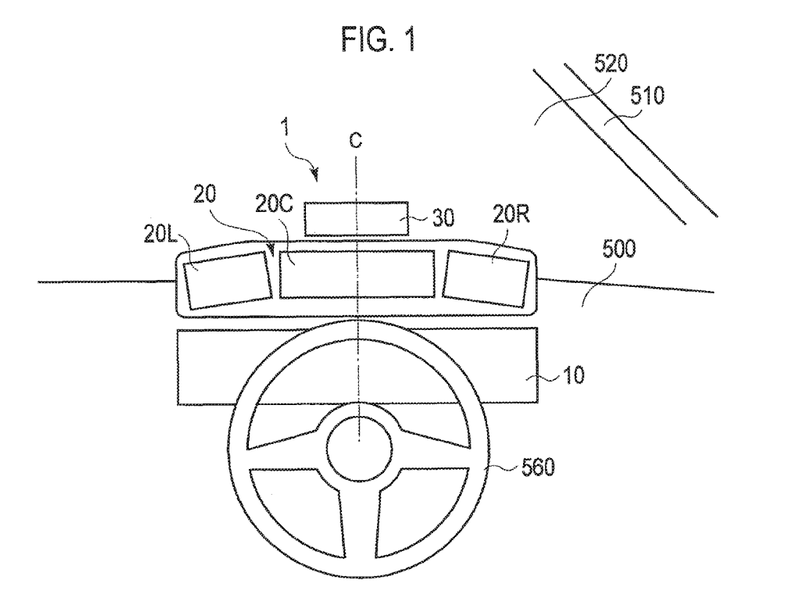
FIG. 1 is an external appearance schematic diagram when a display system according to at least one embodiment is viewed from the driver side.

FIG. 1 is an external appearance schematic diagram when the display system 1 is viewed from a position in which the driver of an automobile is seated in the driver's seat. As illustrated in FIG. 1, the display system 1 is arranged at a dashboard 500, which is an element constituting the automobile, that is, in front of the driver when the driver is seated toward the front of the automobile.

FIG. 1 is an example of a case in which the display system 1 is applied to the automobile in which a steering wheel 560 of the automobile is arranged on the right side. Therefore, the display system 1 is installed at a position near a pillar 510 side of a right side from the center of the automobile on the dashboard 500; however, the embodiment is not limited thereto.

The display system 1 includes a plurality of display screens, as illustrated in FIG. 1. The display system 1 according to the present embodiment illustrated in FIG. 1 includes a first display screen 10, a second display screen 20, and a third display screen 30, wherein each display screen is implemented by a display panel including each display screen, and the like.

The second display screen 20 is configured to include a left display screen 20L, a center display screen 20C, and a right display screen 20R.

The number of display screens included in the display system 1 may be a plural number and is not limited; however, when the display system 1 includes three display screens as illustrated in FIG. 1, effects according to the present embodiment are considerable. In the present embodiment, the display system 1, including three display screens, will be described below.

Configurations for implementing respective display screens will be described later, but in the present embodiment, the first display screen 10 is a display screen of an instrument panel for displaying a speedometer and the like. The second display screen 20 is a display screen of a display panel for displaying the image of a rear camera of the automobile. The third display screen 30 is a display screen of a head-up display for presenting a virtual image to the driver.

As illustrated in FIG. 1, in the direction in which the driver sees a view in front of the automobile through a windshield 520, the first display screen 10, the second display screen 20, and the third display screen 30 are arranged in a longitudinal direction (vertical direction). In FIG. 1, in the first display screen 10, the second display screen 20, and the third display screen 30, the center of each display screen in a horizontal direction is arranged on a straight line C. The display screens are arranged in such a manner so that a driver can appropriately and visually recognize the entire information displayed on each display screen, even in a case where there are many display screens.

Figure 2:
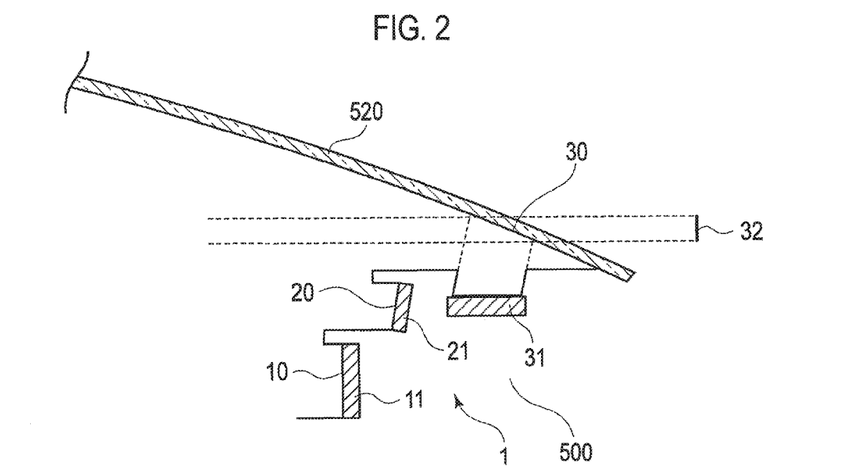
FIG. 2 is a sectional schematic view when the display system according to the embodiment is viewed from the side.

Next, an arrangement example in a depth direction of the respective display screens constituting the display system 1, when they are viewed from the driver, will be described using FIG. 2. FIG. 2 is a sectional schematic view when the display system 1 is viewed from a side.

The first display screen 10 is a display screen of a first display panel 11 to be described later, and is arranged on the dashboard 500 to be directed to a driver side. The second display screen 20 is a display screen of a second display panel 21 to be described later, and is arranged on the dashboard 500 to be directed to the driver side.

In the second display panel 21, an upper end of the second display screen 20 is slantingly arranged to approach the windshield 520 side; however, the present invention is not limited to such an arrangement. When the second display panel 21 is slantingly arranged as illustrated in FIG. 2, it is appropriate that a longitudinal dimension of the display screen is set as a projection dimension viewed from the driver.

The third display screen 30 is a projection plane on the windshield 520, which is generated when the image displayed on a third display panel 31, to be described later, is reflected by the windshield 520, and the user sees a virtual image 32 through the projection plane. In the case of the virtual image 32 illustrated in FIG. 3, it is appropriate that a longitudinal dimension of the display screen is set as a projection dimension viewed from the driver.

As apparent from FIG. 2, the first display screen 10, the second display screen 20, and the third display screen 30 are arranged in order of proximity to the viewpoint position of the driver. The distance from the viewpoint position of the driver is strictly a distance when the three display screens are projected onto a horizontal plane passing through the viewpoint position of the driver.

The first display screen 10, the second display screen 20, and the third display screen 30 are controlled such that the color temperatures of images showing predetermined information displayed on the respective display screens are reduced, as the distance from the viewpoint position of the driver is longer. The first display screen 10, the second display screen 20, and the third display screen 30 are configured such that the longitudinal dimensions of the respective display screens are smaller as the distance from the viewpoint position of the driver is longer.

Figure 3:
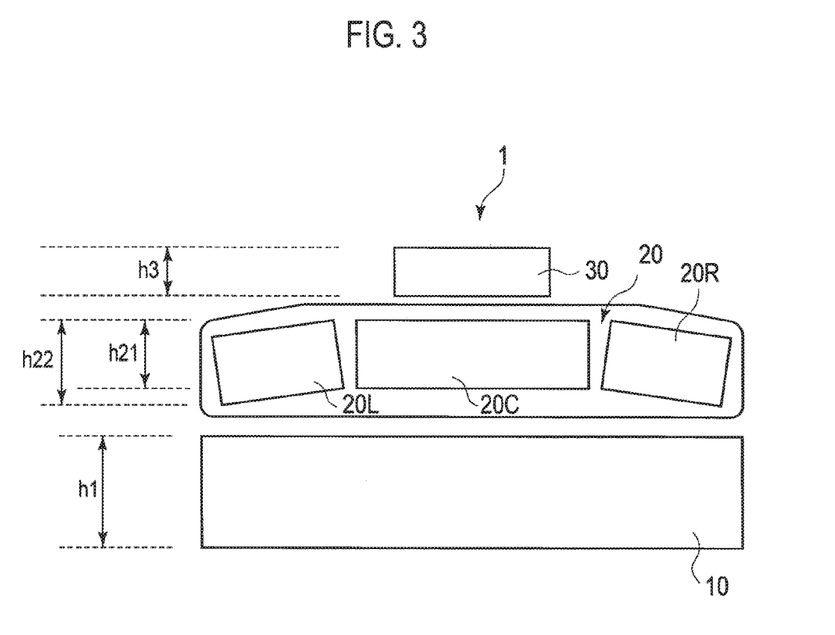
FIG. 3 is a diagram for comparing longitudinal dimensions of display screens constituting the display system according to the embodiment.

FIG. 3 is a diagram for explaining the longitudinal dimensions of the first display screen 10, the second display screen 20, and the third display screen 30. The respective display screens may not be always arranged to face a driver in parallel.

In FIG. 3, the upper and lower ends of the first display screen 10 are arranged to be parallel with the horizontal direction, and the longitudinal dimension of the first display screen 10 is set as h1. The upper and lower ends of the center display screen 20C in the second display screen 20 are arranged to be parallel with the horizontal direction. The left display screen 20L is arranged such that its left side is inclined downward, the right display screen 20R is arranged such that its right side is inclined downward, and the upper and lower ends of the left display screen 20L and the right display screen 20R are not parallel with the horizontal direction.

When the second display screen 20 is formed in such a manner, the longitudinal dimension of the second display screen 20 may be defined as a longitudinal dimension h21 of the center display screen 20C, or as h22 which is an entire longitudinal dimension of the left display screen 20L, the center display screen 20C, and the right display screen 20R. The h21 or the h22 is generically referred to as h2.

The upper and lower ends of the third display screen 30 are arranged to be parallel with the horizontal direction, and the longitudinal dimension of the third display screen 30 is set as h3.

As illustrated in FIG. 3, the first display screen 10 and the second display screen 20 are configured to satisfy a condition of the dimension h1>the dimension h2. The second display screen 20 and the third display screen 30 are configured to satisfy a condition of the dimension h2>the dimension h3.

In the aforementioned condition of the longitudinal dimension, when there is a discriminable difference in the dimensions as compared with a non-discriminable difference in the dimensions, effects according to the present embodiment are greater. As an example of such a condition, when k1 is set as a coefficient of about 0.8 to about 0.9, it is preferable to satisfy a condition of k1×h1>h2 and k1×h2>h3.

Next, a description will be provided for a configuration of the display system 1 of the present embodiment, a configuration for operating the display system 1, and display examples of the respective display screens of the display system 1.

Figure 4:
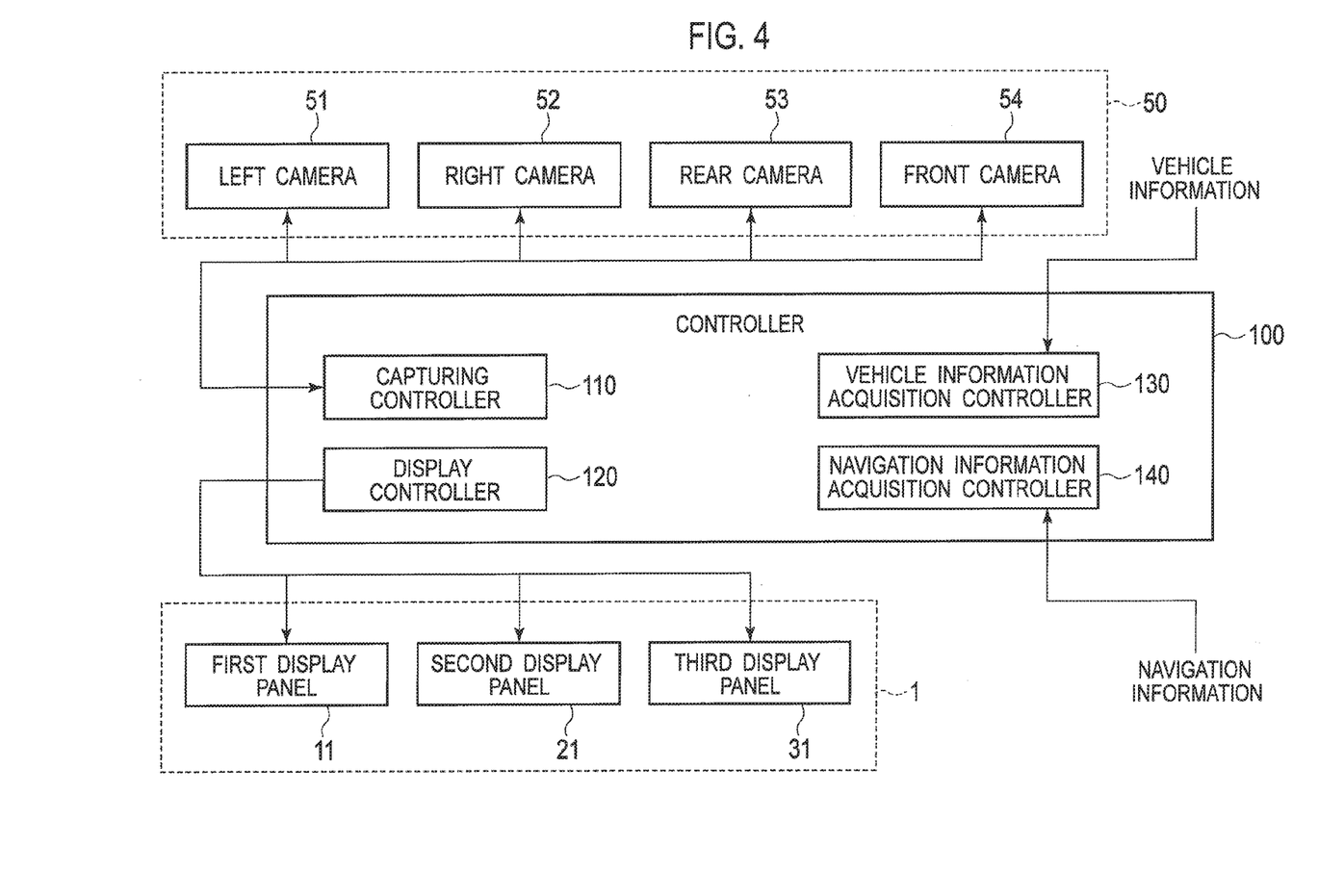
FIG. 4 is a block configuration diagram including the display system according to the embodiment.

FIG. 4 is a block configuration diagram including the display system 1 and a configuration for operating the display system 1. The display system 1 includes the first display panel 11 provided with the first display screen 10, the second display panel 21 provided with the second display screen 20, and the third display panel 31 provided with the third display screen 30.

A controller 100 is configured to include a CPU (Central Processing Unit) and a DSP (Digital Signal Processor) for performing various types of data processing, memory, and the like. The controller 100 controls display operations of the first display panel 11, the second display panel 21, and the third display panel 31. The controller 100 processes image data supplied to the first display panel 11, the second display panel 21, and the third display panel 31.

The controller 100 may be a dedicated control device for performing display-related processing. The controller 100 may be an in-vehicle control device for controlling a microcomputer installed in a vehicle, or a control device for controlling a navigation device. The controller 100 may be an arbitrary control device. The controller 100 may be configured to use a partial combination of the functions of the plurality of aforementioned control devices.

In order to acquire the image displayed on the second display screen 20 by the second display panel 21, an automobile installed with the display system 1 includes a camera device 50. As an example, the camera device 50 includes a left camera 51 for capturing the rear side from the left side of the automobile, a right camera 52 for capturing the rear side from the right side of the automobile, a rear camera 53 for capturing the rear side from the automobile, and a front camera 54 for capturing the front of the automobile.

Figure 7:
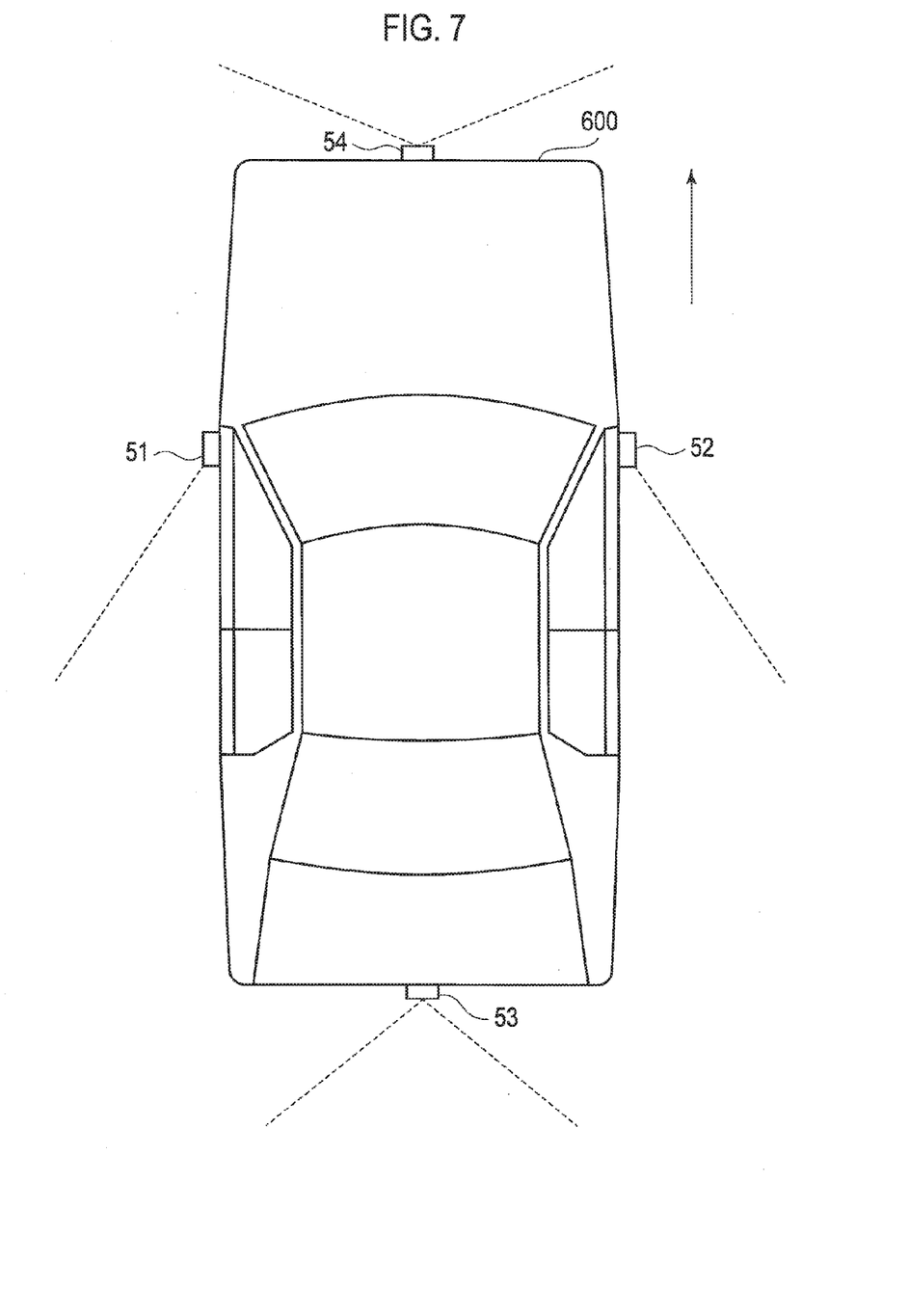
FIG. 7 is a conceptual diagram illustrating an example of a mounting position and a capturing direction of a camera in a vehicle installed with the display system according to the embodiment.

An arrangement example of the camera device 50 will be described using FIG. 7. As illustrated in FIG. 7, the left camera 51 is arranged to face backward at the left side of an automobile 600 and its capturing view angle includes the rear side from the left side of the automobile 600. Similarly, the right camera 52 is arranged to face backward at the right side of the automobile 600 and its capturing view angle includes the rear side from the right side of the automobile 600.

The rear camera 53 is arranged to face backward at the rear portion of the automobile 600 and its capturing view angle includes the rear side of the automobile. The front camera 54 is arranged to face forward at the front portion of the automobile 600 and its capturing view angle includes the front of the automobile. An arrow in FIG. 7 indicates a forward movement direction of the automobile 600.

Returning to FIG. 4, the controller 100 includes a capturing controller 110, a display controller 120, a vehicle information acquisition controller 130, and a navigation information acquisition controller 140 on the basis of its functions. The respective functions may be performed by a control function provided in a single device, or a control function provided in a plurality of distributed devices.

The capturing controller 110 controls a capturing operation of the camera device 50. Specifically, the capturing controller 110 controls capturing start or stop, controls the capturing view angle and the diaphragm, and controls acquisition of a captured image.

The display controller 120 controls the first display panel 11, the second display panel 21, and the third display panel 31 to perform various types of display. Specifically, the display controller 120 controls display modes, display luminance and the like of the respective display panels. The display controller 120 controls setting of color temperatures of image data to be displayed on the first display panel 11, the second display panel 21, and the third display panel 31.

The vehicle information acquisition controller 130 controls acquisition of automobile-related information. Specifically, the vehicle information acquisition controller 130 acquires a vehicle speed, an engine speed, an engine cooling water temperature, a remaining fuel amount, a shift position and the like, and various types of information not limited thereto.

The navigation information acquisition controller 140 acquires information from a navigation device (not illustrated). When a controller of the navigation device is included in the configuration of the controller 100 or when the controller 100 is implemented using the controller of the navigation device, the navigation information acquisition controller may not be provided.

The navigation information acquisition controller 140 acquires route guide information, including map information, next advancing direction information, peripheral facility information and the like from the navigation device (not illustrated). When the navigation device has a content reproduction function, the navigation information acquisition controller 140 acquires content-related information.

The controller 100 has a network function in addition to the aforementioned functions, and may acquire various types of information from an external information source. The controller 100 may interpret images captured by the camera device 50 and generate information to be displayed. As a specific example, the controller 100 recognizes a traffic lane by a captured image of the front camera 54, and generates display information equal to the traffic lane.

The first display screen 10 is a display screen of an instrument panel implemented by the first display panel 11 as a specific example. The first display panel 11 implemented with a liquid crystal display panel, an organic EL (Electro Luminescence) panel and the like.

A specific example of information to be displayed on the first display screen 10 is information on the running of the vehicle. The information on the running of the vehicle, for example, includes speed information of the automobile, engine speed information, water temperature and temperature information of the engine and the driving system, fuel-related information, various types of alert information and the like, which are acquired by the vehicle information acquisition controller 130.

The first display screen 10 also displays information related to the content such as the navigation display and audio, which are acquired by the navigation information acquisition controller 140. The first display screen 10 may also display the current time information acquired using a network and the like, weather information of a current place and destination, and the like.

Figure 5:
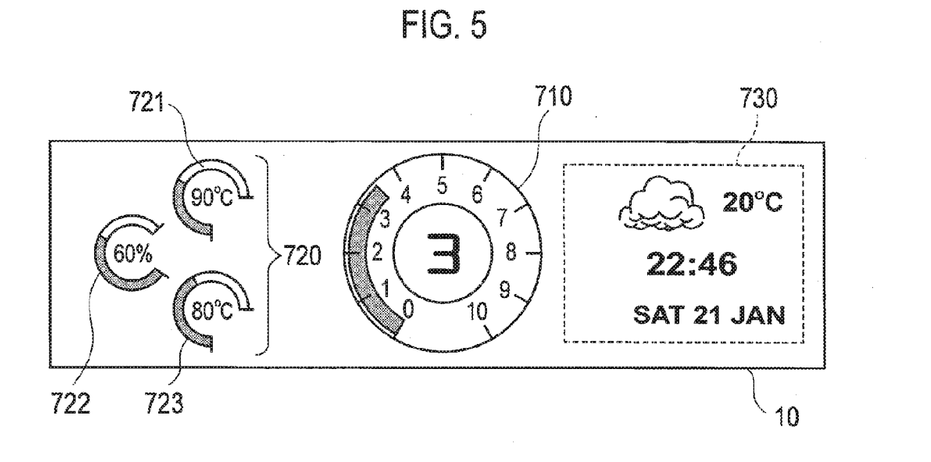
FIG. 5 is a schematic diagram of a display example in the first display screen according to the embodiment.

FIG. 5 illustrates a display example of the first display screen 10. In the example of FIG. 5, a tachometer display part 710 indicating an engine speed is displayed on the center of the first display screen 10. Instead of the tachometer display part 710, a speedometer indicating running speed information may also be displayed.

The tachometer display part 710 illustrated in FIG. 5 is a display showing a rotation indicator on the basis of information on the engine speed of the automobile. At the center portion of the tachometer display part 710, shift position information is displayed. At the center portion or the interior portion of the tachometer display part 710, running speed information, distance information and the like may be displayed additionally. The vehicle information acquisition controller 130 acquires these types of information.

On a vehicle information display part 720, information on the situations of an automobile is mainly displayed. As a specific example, as illustrated in FIG. 5, the vehicle information display part 720 includes the oil temperature display portion 721 indicating engine oil temperature information, a fuel display portion 722 indicating remaining fuel amount information, and a water temperature display portion 723 indicating engine cooling water temperature. The vehicle information display part 720 is not limited to the display of the aforementioned information and is not limited to the number of the aforementioned display objects.

On an additional information display part 730, information on the vehicle exterior, and information on the path and content are mainly displayed. As a display example of the additional information display part 730, as illustrated in FIG. 5, there is weather information, time information, date information and the like. The additional information display part 730 is not limited to the display of the aforementioned information.

Information displayed on the second display screen 20 includes the image obtained by capturing the rear side of an automobile as a specific example. The left display screen 20L, the center display screen 20C, and the right display screen 20R are configured using display panels different from one another; however, they may be implemented by dividing a display section of one continuous display panel.

Information displayed on the center display screen 20C includes the image obtained mainly by capturing the rear center of the automobile, and the image captured by the rear camera 53 provided at the rear side of the automobile 600 as illustrated in FIG. 7.

Information displayed on the left display screen 20L includes the image obtained mainly by capturing the left rear side of the automobile, and the image captured by the left camera 51 provided at the side of the automobile 600 as illustrated in FIG. 7. Information displayed on the right display screen 20R includes the image obtained mainly by capturing the right rear side of the automobile, and the image captured by the right camera 52 provided at the side of the automobile 600 as illustrated in FIG. 7.

Information displayed on the third display screen 30, as a specific example, includes information displaying the speed, the advancing direction of the automobile, alert information and the like through a head-up display capable of seeing important information with less sight movement when the driver sees the vehicle exterior through the windshield 520. In this case, the third display screen 30 is the virtual image 32 projected onto the windshield 520.

On the third display screen 30, the virtual image 32 is projected by the third display panel 31 having a display plane disposed toward the windshield 520 in an upper direction. Similarly to the first display panel 11, the second display panel 21 and the third display panel 31 are implemented with a liquid crystal display panel, an organic EL panel and the like; however, there is no limitation in a virtual image projection structure as a head-up display constituting the third display screen 30.

Figure 6:
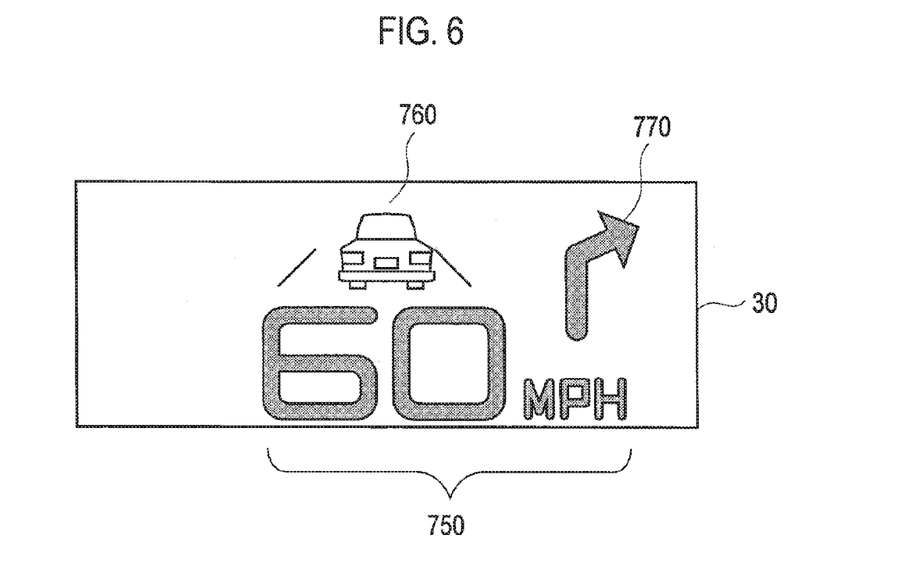
FIG. 6 is a schematic diagram of a display example in the third display screen according to the embodiment.

FIG. 6 illustrates a display example of the third display screen 30. In FIG. 6, a speed information display part 750 displays automobile speed information as a numeral value. A traffic lane information display part 760 generates a linear image equal to a traffic lane extracted by the controller 100 through interpretation of the image captured by the front camera 54, and displays a positional relation between the automobile and the traffic lane. The linear image showing the traffic lane may give an alert by changing the display color when the automobile approaches a left traffic lane or a right traffic lane. A destination simple display part 770 is an arrow display indicating an advancing direction at a next advancing direction change point, acquired by the navigation information acquisition controller 140.

In the display system 1 according to the present embodiment, three types of display screens are provided in the line of sight of the driver, and the longitudinal dimensions of the display screens are configured to be smaller, as the distance from the viewpoint position of the driver is longer. Therefore, as the distance from the viewpoint position of the driver is longer, the display screens are recognized as if they exist farther than actual display screen positions, so that it is possible to reduce a feeling of oppression or fatigue due to many display screens or a large amount of information.

Next, color temperatures in the respective display screens set by the display controller 120 in the display system 1 configured as above will be described. The color temperatures are adjusted by balance of the output levels of RGB signals as white balance in the case of generally displaying a white color.

The display controller 120 sets the highest color temperature of information to be displayed on the first display screen 10, and sets the lowest color temperature of information to be displayed on the third display screen 30. As a specific example, the display controller 120 allows a white color to be displayed on the first display screen 10 to be a color temperature of about 6,500 K, allows a white color to be displayed on the second display screen 20 to be a color temperature of about 5,000 K, and allows a white color to be displayed on the third display screen 30 to be a color temperature of about 4,000 K.

The setting of the color temperatures by the display controller 120 is not limited to the aforementioned values or differences of the aforementioned color temperatures; however, when a difference of the color temperatures among the display screens is equal to or more than 1,000 K from 500 K, effects according to the present embodiment are considerable.

In the aforementioned display system 1, in a display screen in which a distance from the viewpoint position of a driver is longer, content to be displayed with a white color not emphasized, so that it is possible to reduce the feeling of oppression or fatigue due to many display screens or a large amount of information.

It is known that the lower the color temperature of the information is, the less visually the feeling of fatigue is felt. Therefore, for the purpose of safety, the image with a low color temperature is displayed on a display screen near the vehicle exterior, that is, a display screen in which the distance from the viewpoint position of the driver is longer, resulting in a reduction of the feeling of oppression or fatigue of the driver who sees the vehicle exterior for a long time.

When the third display screen 30 is the virtual image 32 by a head-up display, the virtual image 32 is superimposed on the scenery of a vehicle exterior display. Therefore, when a center line, a snowy road and the like are superimposed on the third display screen 30, the color temperature of a white color to be displayed on the third display screen 30 is set to be low, so that the white color display does not melt into the scenery of the vehicle exterior, and it is possible to ensure visibility.

The display controller 120 may set the color temperature of information to be displayed to be lower, as approaching the center portion of the display screen in the respective display screens.

For example, as illustrated in FIG. 5, in the display example of the first display screen 10, the tachometer display part 710 is displayed in the center portion of the first display screen 10, and the vehicle information display part 720 and the additional information display part 730 are displayed at the right and left side thereof. In this case, the color temperature for displaying the tachometer display part 710 is set to be lower than color temperatures for displaying the vehicle information display part 720 and the additional information display part 730.

As a specific example, when a white color to be displayed on the first display screen 10 is set to about 6,500 K, the color temperature of a white color to be displayed on the tachometer display part 710 is set to about 6,000 K, and a color temperature of a white color to be displayed on the vehicle information display part 720 and the additional information display part 730 is set to about 6,500 K.

When the second display screen 20 is configured to include the left display screen 20L, the center display screen 20C, and the right display screen 20R, the color temperature of the center display screen 20C is set to be lower than the color temperatures of the left display screen 20L and the right display screen 20R.

As a specific example, when a white color to be displayed on the second display screen 20 is set to about 5,000 K, the color temperature of a white color to be displayed on the center display screen 20C is set to about 4,500 K, and the color temperature of a white color to be displayed on the left display screen 20L and the right display screen 20R is set to about 5,000 K.

The display controller 120 may set the color temperature of information to be displayed to be lower, as approaching the center portion of the display screen in the respective display screens, and may set different color temperatures in the right and left screens from each other.

For example, as illustrated in FIG. 1, when the display system 1 is applied to an automobile in which the steering wheel 560 is disposed at the right side, a color temperature for displaying the tachometer display part 710 is set to be lower than the color temperatures for displaying the vehicle information display part 720 and the additional information display part 730, and the color temperature for displaying the additional information display part 730 is set to be lower than that for displaying the vehicle information display part 720 in a display example of the first display screen 10, as illustrated in FIG. 5. In an automobile in which the steering wheel 560 is disposed at the left side, the setting of the right and left color temperatures is reversed.

As a specific example, when a white color to be displayed on the first display screen 10 is set to about 6,500 K, the color temperature of a white color to be displayed on the tachometer display part 710 is set to about 6,000 K, the color temperature of a white color to be displayed on the vehicle information display part 720 is set to about 6,500 K, and the color temperature of a white color to be displayed on the additional information display part 730 is set to about 6,300 K.

The color temperature of the center display screen 20C is set to be lower than the color temperatures of the left display screen 20L and the right display screen 20R, and the color temperature of the right display screen 20R is set to be lower than that of the left display screen 20L. In an automobile in which the steering wheel 560 is disposed on the left side, the setting of the right and left color temperatures are reversed.

As a specific example, when a white color to be displayed on the second display screen 20 is set to about 5,000 K, the color temperature of a white color to be displayed on the center display screen 20C is set to about 4,500 K, the color temperature of a white color to be displayed on the left display screen 20L is set to about 5,000 K, and the color temperature of a white color to be displayed on the right display screen 20R is set to about 4,800 K.

Such a display is performed so that it is possible to perform a display with feeling of depth, and to suppress the occurrence of a feeling of oppression or fatigue. According to the display system of the present embodiment, it is possible to present various types of information by a plurality of display screens, while suppressing the occurrence of a feeling of oppression or fatigue.

The present embodiment can be variously changed without departing from the scope thereof. For example, in the present embodiment, the third display screen 30 is used for virtual image display; however, other display screens may also be used for virtual image display.

In the aforementioned present embodiment, color temperatures set by the display controller 120 are described as fixed values; however, setting values of the color temperatures may be changed depending on conditions. For example, after the light amount of an exterior or an interior of an automobile is measured, high and low conditions of color temperatures in the respective display screens are maintained according to the measured light amount. When the surrounding is bright, a wholly high color temperature may be set, and when the surrounding is dark, a wholly low color temperature may be set.

As the running speed of an automobile is higher, the display controller 120 may set a wholly high color temperature, or may allow a difference of color temperatures among the respective display screens to be small while maintaining high and low conditions of the color temperatures in the respective display screens. In this case, it is possible to allow information to be displayed on a head-up display, which is the third display screen 30, to be instantaneously recognized while maintaining effects of the present embodiment.

The aforementioned present embodiment has a configuration in which the longitudinal dimensions of the plurality of display screens are smaller, as the distance from the viewpoint position of the driver is longer; however, when the transverse dimensions of the plurality of display screens are configured to be smaller, as the distance from the viewpoint position of the driver is longer, it is more effective.

Figure 8:
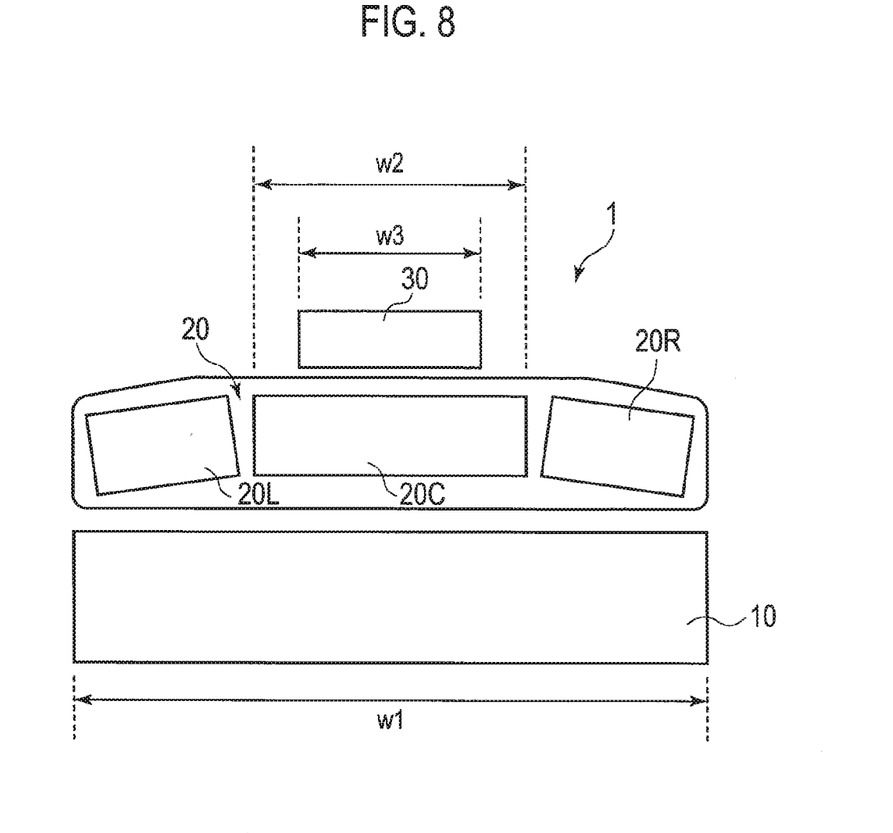
FIG. 8 is a diagram for comparing lateral dimensions of the display screens constituting the display system according to the embodiment.

With reference to FIG. 8, a description will be provided for a display system 1 in which the transverse dimensions of the plurality of display screens are smaller, as the distance from the viewpoint position of a driver is longer. When the transverse dimension of the first display screen 10 is set as w1, the transverse dimension w2 of a center display screen 20C, constituting a second display screen 20, is configured to satisfy the condition of w1>w2.

Similarly, when the transverse dimension of the third display screen 30 is set as w3, it is configured to satisfy the condition of w2>w3. The transverse dimension of the center display screen 20C is used as the definition of the transverse dimension of the second display screen 20; however, it may be defined as transverse dimensions including a left display screen 20L and a right display screen 20R.

In the embodiment illustrated in FIG. 8, the left display screen 20L and the right display screen 20R are slantingly arranged with a depth in relation to the third display screen 30. Therefore, even when there is no large difference between the transverse dimension of the second display screen 20, including the left display screen 20L, the right display screen 20R, and the transverse dimension of the first display screen, a feeling of oppression is reduced.

In the aforementioned condition of the transverse dimension, when there is a discriminable difference in the dimensions as compared with a non-discriminable difference in the dimensions, effects according to the present embodiment are considerable. As an example of such a condition, when k2 is set as a coefficient of about 0.5 to about 0.7, it is preferable to satisfy the condition of k2×w1>w2 and k2×w2>w3.

What is claimed is:

1. A display system comprising:
   a plurality of display screens disposed in front of a driver of a vehicle in a vertical direction in a row such that a distance from a viewpoint position of the driver is correspondingly longer, according to a height of a vertical position of the screen, and configured to present images showing predetermined information to the driver, the plurality of display screens comprising a first display screen of a display panel and a second display screen of a head-up display for presenting a virtual image above the first display screen; and
   a display controller configured to display the images with a lower color temperature on at least one of the plurality of display screens as compared to at least one other screen, the images with the lower color temperatures corresponding to a longer distance from the viewpoint position, with a difference of the color temperatures between two adjacent display screens equal to or more than 500 K.

2. The display system according to claim 1, wherein the display controller controls to display an image with a lower color temperature on at least one display screen among the plurality of display screens, as approaching a center portion in a horizontal direction of the display screen.

3. The display system according to claim 1, wherein the plurality of display screens become smaller in vertical dimension, as the distance from the viewpoint position of the driver is longer.

4. The display system according to claim 1, wherein the plurality of display screens have centers arranged on a straight line in a horizontal direction when viewed from the driver.

5. The display system according to claim 1, wherein the plurality of display screens become smaller in horizontal dimension, as the distance from the viewpoint position of the driver is longer.

6. The display system according to claim 1, wherein the plurality of display screens further comprises a third display screen for displaying information on running of the vehicle, the third display screen is disposed such that a distance from the viewpoint position is the shortest and a vertical position is the lowest, the first display screen for displaying an image of a rear side from the vehicle captured by a camera.

* * * * *